(12) United States Patent
Wood

(10) Patent No.: US 7,548,194 B2
(45) Date of Patent: Jun. 16, 2009

(54) HOSTILE INTENTION ASSESSMENT SYSTEM AND METHOD

(75) Inventor: Thomas E. Wood, Portsmouth, RI (US)

(73) Assignee: Raytheon Company, Waltham, MA (US)

( * ) Notice: Subject to any disclaimer, the term of this patent is extended or adjusted under 35 U.S.C. 154(b) by 142 days.

(21) Appl. No.: 11/374,830

(22) Filed: Mar. 14, 2006

(65) Prior Publication Data

US 2007/0216566 A1 Sep. 20, 2007

(51) Int. Cl.
G08B 23/00 (2006.01)
G08B 21/00 (2006.01)
G01S 13/88 (2006.01)
G01S 13/66 (2006.01)
G01S 13/00 (2006.01)

(52) U.S. Cl. .......................... 342/195; 342/73; 342/74; 342/118; 342/119; 342/175; 89/1.11; 340/984

(58) Field of Classification Search .................. 342/27, 342/28, 52–68, 175, 195, 73–81, 89–103, 342/118, 146, 147–158, 119; 89/1.11, 1.816–1.819; 244/3.1–3.3; 701/300–302, 1–18; 348/143–149, 348/152; 340/540, 945, 961, 963, 971, 984
See application file for complete search history.

(56) References Cited

U.S. PATENT DOCUMENTS

| 4,146,892 | A | * | 3/1979 | Overman et al. ............... 342/13 |
| 4,417,248 | A | * | 11/1983 | Mathews .................... 701/301 |
| 5,406,286 | A | * | 4/1995 | Tran et al. ..................... 342/13 |
| 5,563,601 | A | * | 10/1996 | Cataldo ........................ 342/28 |
| 5,680,138 | A | * | 10/1997 | Pritt ........................... 342/179 |
| 5,754,140 | A | | 5/1998 | Starr et al. |
| 6,137,436 | A | * | 10/2000 | Koch ........................... 342/61 |
| 6,408,248 | B1 | | 6/2002 | Yancey, Jr. et al. |
| 6,561,074 | B1 | * | 5/2003 | Engel et al. ................. 89/1.818 |
| 6,563,450 | B1 | * | 5/2003 | Wallace ...................... 342/13 |
| 6,568,628 | B1 | * | 5/2003 | Curtin et al. ............... 244/3.14 |
| 6,575,400 | B1 | * | 6/2003 | Hopkins et al. ............ 244/3.19 |
| 6,603,421 | B1 | * | 8/2003 | Schiff et al. .................... 342/13 |
| 6,756,934 | B1 | * | 6/2004 | Chen et al. ..................... 342/13 |
| 6,771,205 | B1 | * | 8/2004 | Barton et al. ................. 342/13 |
| 6,877,691 | B2 | * | 4/2005 | DeFlumere et al. ........... 342/52 |
| 6,995,660 | B2 | * | 2/2006 | Yannone et al. .............. 342/45 |
| 7,012,520 | B2 | * | 3/2006 | Webb, Sr. ................... 348/143 |
| 7,046,187 | B2 | * | 5/2006 | Fullerton et al. ............. 342/54 |
| 7,132,961 | B2 | * | 11/2006 | Yannone et al. ............. 340/961 |
| 7,158,028 | B1 | * | 1/2007 | Ghahramani ................ 340/540 |
| 7,205,927 | B2 | * | 4/2007 | Krikorian et al. ........... 342/179 |
| 7,236,121 | B2 | * | 6/2007 | Caber ........................... 342/62 |
| 2004/0223056 | A1 | * | 11/2004 | Norris, Jr. .................... 348/152 |
| 2006/0028373 | A1 | * | 2/2006 | Fullerton et al. ............. 342/67 |

* cited by examiner

Primary Examiner—Bernarr E Gregory
(74) Attorney, Agent, or Firm—Iandiorio Teska & Coleman

(57) ABSTRACT

A hostile intention assessment system and method wherein a tracking sensor subsystem (e.g., radar) tracks targets relative to a critical asset. Determinations are made to assess if a first target is approaching a second target, and to assess if the second target is approaching the critical asset. If the first target is approaching the second target to hide in the radar shadow thereof and the second target is approaching sufficiently close to the critical asset, an alert is generated.

54 Claims, 5 Drawing Sheets

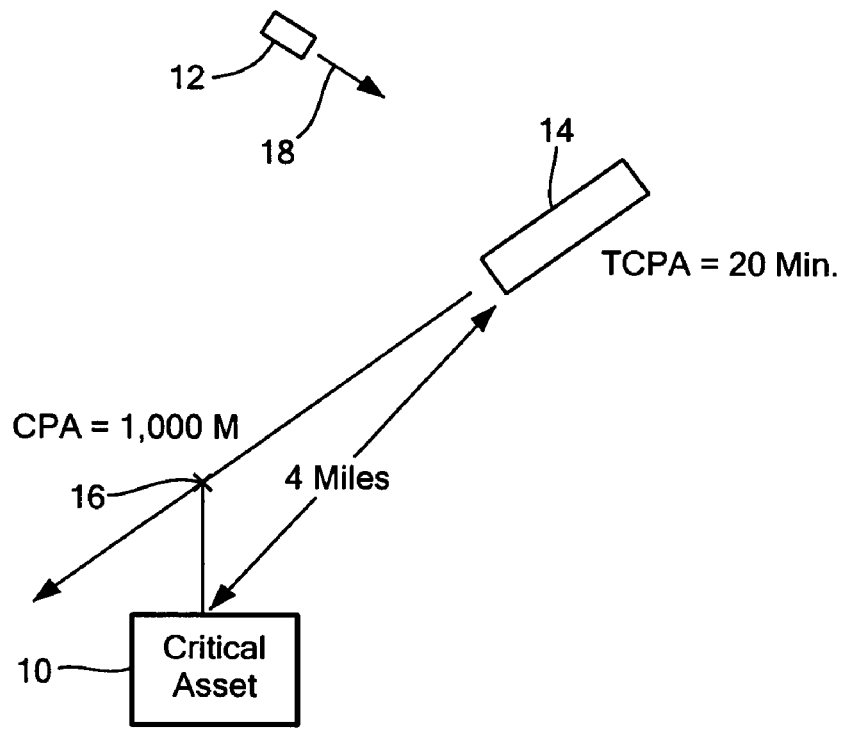
*FIG. 1A*
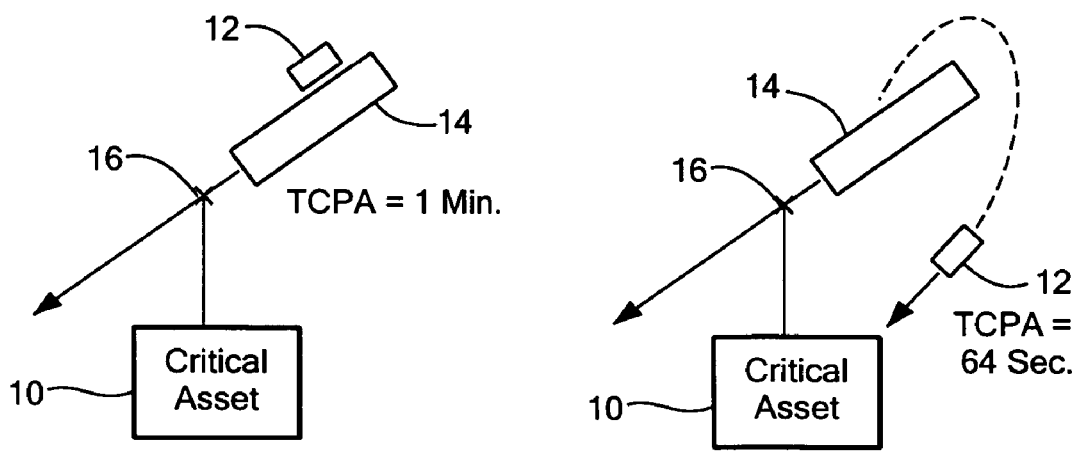
*FIG. 1B*  *FIG. 1C*

HOSTILE INTENTION ASSESSMENT SYSTEM AND METHOD

FIELD OF THE INVENTION

This subject invention relates to tracking sensor systems such as radar systems typically used to monitor marine traffic.

BACKGROUND OF THE INVENTION

Tracking sensor systems e.g. a radar system or subsystems such as Raytheon's Mariner 2200 and AN/SPS-73 radar system are used to monitor marine traffic. These systems meet the specifications of the International Maritime Organization for automatic radar plotting aids and thus can be used to track other vessels relative to a vessel equipped with such a radar system. Land based versions of such radar systems are also used to track vessels relative to a critical asset such as a nuclear power plant.

Terrorists, pirates, drug runners, smugglers, and vessels carrying illegal immigrants, however, have learned how to defeat attempts to monitor their activities by hiding in the "radar shadow" of larger ships and vessels. Using conventional radar systems, both a small craft at some distance from a critical asset (e.g., a ship or important installation) and a large vessel at some distance from the critical asset can be tracked. The closest point of approach (CPA) of the large ship to the critical asset is determined and the time to reach that closest point of approach (TCPA) is determined. No proximity alert is generated if the TCPA of the larger ship is greater than a predetermined threshold (e.g., 20 min) even if the CPA is small (e.g., 100 m). And, the CPA of the smaller craft may presently be too large to generate an alarm. But, suppose that the small craft has a vector (direction and speed) relative to the larger ship such that the smaller craft will intersect the larger ship. In just a few minutes, the smaller craft may enter the radar shadow of the larger ship and the smaller craft will then not be trackable by radar.

A typical radar system will then drop the track of the smaller craft because a radar update for it was not acquired for several minutes. The operator is not notified. 20 minutes later, when the larger ship is at its CPA relative to the critical asset with the smaller craft hiding in the radar shadow behind the larger ship, the smaller craft may maneuver at high speed towards the critical asset. At 30 knots, the small craft will reach the critical asset quickly. At best, a conventional radar system will have reacquired the track of the smaller craft for only about 4 seconds when its range to the critical asset is 60 meters or less. In many instances, this is not enough time to properly react to the smaller craft. Moreover, acquisition of a track at very short range is not as simple as at longer ranges because of receiver blanking after transmitter trigger, antenna elevation pattern losses, and steep angles into sea clutter. Also, many engagement systems are not designed to operate at very short ranges.

Conventional collision avoidance technology is able to determine if either the large ship or the small craft are on a collision course with a vessel equipped with the appropriate radar system. But, such collision avoidance technology cannot be used to determine if the small craft is maneuvering to hide in the radar shadow of the larger ship in order to approach the vessel with hostile intentions.

SUMMARY OF THE INVENTION

It is therefore an object of this invention to provide a hostile intention assessment system and method.

It is a further object of this invention to provide such a system and method which can be implemented in existing radar and other tracking sensor systems.

It is a further object of this invention to provide such a system and method which can be implemented wholly in software.

It is a further object of this invention to provide such a system and method which prevents terrorists, drug runners, vessels carrying illegal immigrants, and others from evading detection.

It is a further object of this invention to provide such a system and method which is mostly automatic in nature and provides enhanced situational awareness.

It is a further object of this invention to provide such a system and method which is low cost, easy to implement, and simple to use.

It is a further object of this invention to provide such a system and method which prevents the generation of false alarms.

The subject invention results from the realization that potential hostile maneuvers can be detected and assessed, in one preferred embodiment, by generating an alert if a large vessel is approaching sufficiently close to a critical asset and also if a small craft is approaching the larger vessel in an attempt to hide in its radar shadow. False alarms are avoided by, inter alia, generating an alert only if the duration of violations of the closest point of approach limit and the time to the closest point of approach minimum of the smaller craft relative to the larger vessel are sufficiently long and the smaller craft has not been classified as friendly. Additional alerts and actions are typically provided automatically after the smaller craft enters the radar shadow of the larger vessel.

The subject invention, however, in other embodiments, need not achieve all these objectives and the claims hereof should not be limited to structures or methods capable of achieving these objectives.

This invention features a hostile intention assessment system. There is typically a tracking sensor subsystem (e.g., a radar system) for tracking targets relative to a critical asset. A processing subsystem (implemented e.g., on a computer) is responsive to the tracking sensor subsystem and programmed to determine if a first target is approaching a second target and to determine if the second target is approaching the critical asset. If the first target is approaching the second target and the second target is approaching the critical asset, at least a first alert is automatically generated.

Typically, determining if the first target is approaching the second target includes computing the closest point of approach and the time to the closest point of approach of the first target relative to the second target. Similarly, determining if the second target is approaching the critical asset includes computing the closest point of approach of the second target relative to the critical asset. To prevent false alarms, the processing subsystem is further programmed to determine the size of the first and second targets and to generate the first alert only if the first target is smaller than the second target by a predetermined amount. False alarms are also prevented by ensuring the smaller target is further from the critical asset than the larger target before generating an alert. The size of the first and second targets may be determined by the spacial extent of the targets or the radar cross section of the targets. False alarms are further prevented by generating the alert only when the closest point of approach and the time to the closest point of approach of the first target relative to the second target are below predetermined thresholds. False alarms are still further prevented by timing the occurrence of the closest point of approach and the time to the closest point of approach of the first target relative to the second target being below the predetermined thresholds. The first alert is generated only if the time duration is greater than a predetermined time duration.

In one preferred system, the processing subsystem is further programmed to prioritize the tracks of the first and second targets after generating the first alert. There may also be more alerts than the first alert. For example, the processing subsystem can be further programmed to generate a second alert if the first target is not trackable by the sensor subsystem. If the tracking sensor subsystem is configured to provide a track quality indicator for targets, the processing subsystem generates the second alert if the track quality indicator of the first target is below a predetermined threshold. Preferably, the processing subsystem is further programmed to associate the track of the first target with the track of the second target if the first target is not trackable by the sensor subsystem and to generate a third alert if the first target is then later reacquired by the sensor subsystem.

Although a typical tracking sensor subsystem includes a radar subsystem, alternatively, the tracking subsystem may include an infrared-based surveillance and tracking subsystem.

In one embodiment, the critical asset is equipped with the tracking sensor subsystem and the processing subsystem. In another embodiment, the critical asset is monitored by an installation equipped with the tracking sensor subsystem and the processing subsystem.

One example of a hostile intention assessment system in accordance with this invention generates a first alert when the computed closest point of approach of a second target relative to a critical asset are below predetermined thresholds, the size of a first target is small relative to the size of the second target, and the computed closest point of approach and time to the closest point of approach of the first target relative to the second target are below predetermined thresholds for a predetermined duration.

A more fundamental characterization of an example of a hostile intention assessment system in accordance with the subject invention is a radar subsystem for tracking targets relative to a critical asset in conjunction with a processing subsystem responsive to the radar subsystem. The processing subsystem determines if a smaller craft is approaching a larger vessel to hide in the radar shadow thereof, determines if the larger vessel is approaching the critical asset, and generates a first alert in response. The processing subsystem may prioritize the tracks of the first and second targets after generating the first alarm, may generate a second alert if the first target is not trackable by the radar subsystem, may associate the track of the first target with the track of the second target if the first target is not trackable by the sensor subsystem, and may generate a third alert if the first target is reacquired by the radar subsystem.

One hostile intention assessment method in accordance with this invention features the steps of tracking targets relative to a critical asset, determining if a first target is approaching a second target, determining if a second target is approaching the critical asset, and generating a first alert when the first target is approaching the second target and the second target is approaching the critical asset.

In one example, a hostile intention assessment system includes a processing subsystem configured to compute the approach a first target relative to a second target, compute the approach of the second target relative to a critical asset, determine the size of the first target relative to the second target, and determine relationship (e.g., distance) of both the first and second targets relative to the critical asset. An alert is generated automatically when the computed approach of the second target relative to the critical asset meets a predetermined threshold, the size of the first target is small relative to the size of the second target, the computed approach of the first target relative to the second target meets a predetermined threshold for a predetermined duration, and the smaller target is further from the critical asset than the larger target.

BRIEF DESCRIPTION OF THE DRAWINGS

Other objects, features and advantages will occur to those skilled in the art from the following description of a preferred embodiment and the accompanying drawings, in which:

FIGS. 1A-1C are schematic depictions showing how a small craft is able to use the radar shadow of a larger vessel in order to approach a critical asset;

DISCLOSURE OF THE PREFERRED EMBODIMENT

Figure 2A:
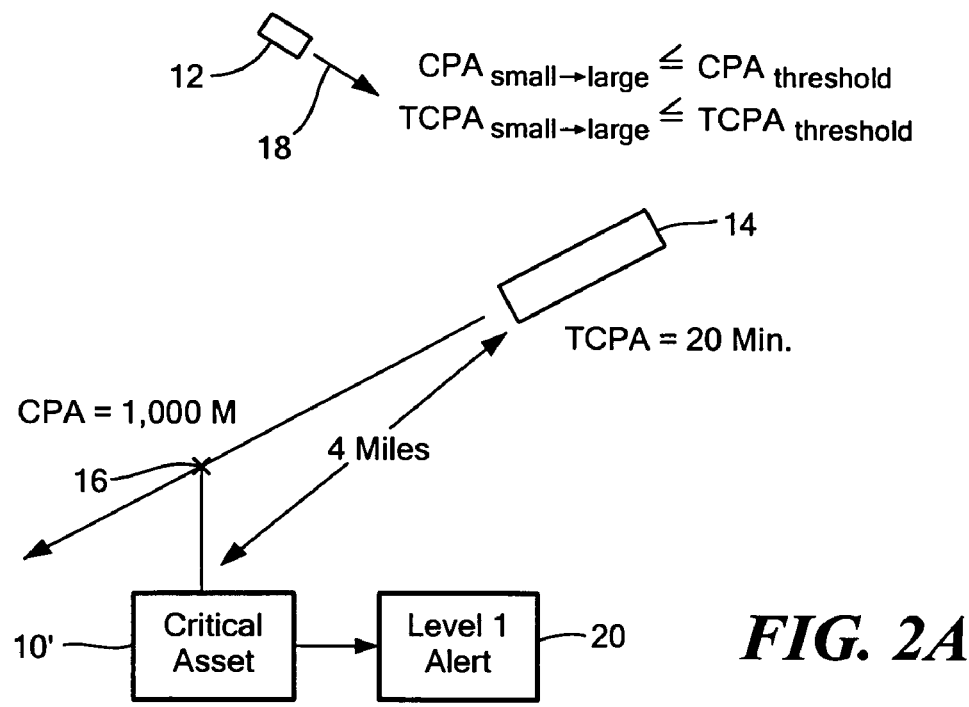
FIG. 2A is a schematic depiction showing how the system and method of the subject invention generates a Level 1 alert when it is determined that the smaller craft is attempting to hide in the radar shadow of a larger craft.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, terrorists, pirates, drug runners, smugglers carrying illegal immigrants, and others have learned how to defeat attempts to monitor their activities by hiding in the radar shadow of larger ships and vessels. Using conventional radar systems associated with critical asset 10, FIG. 1A, both a small craft 12 five miles from the critical asset (e.g., a ship or important installation) and a large vessel 14 four miles from the critical asset can be tracked. The closest point of approach 16 of the large ship to the critical asset is determined and the time to reach that closest point of approach (TCPA) is also determined. No proximity alert is generated, however, if the TCPA of the larger ship is greater than a predetermined threshold (e.g., 20 min) even if the CPA 16 is small (e.g., 1000 m). And, the CPA of the smaller craft 12 may presently be too large to generate an alarm. But, suppose that the small craft has a vector 18 (direction and speed) relative to large ship 14 such that small craft 12 will intersect large ship 14 in just a few minutes. Small craft 12 will then be in the radar shadow of the larger ship as shown in FIG. 1B. A typical radar system will then drop the track of the smaller craft because a radar update for it has not been acquired for several minutes. The operator is typically not notified. 20 minutes later, as shown in FIG. 1C, when the large ship is at or near CPA 16 relative to critical asset 10 with small craft 12 hiding in the radar shadow behind large ship 14, small craft 12 may maneuver at high speed towards critical asset 10. At 30 knots, the small craft 12 reaches the critical asset quickly. At best, a conventional radar system will have reacquired the track of small craft 12 for only 4 seconds when its range to critical asset 10 is 60 meters or less. In many instances, this is not enough time to properly react to the smaller craft. Moreover, acquisition of the track of small craft 12 at very short range can be very complex because of receiver blanking after transmitter trigger, antenna elevation pattern losses, and steep angles into sea clutter. Also, not all engagement systems are designed to operate at these short ranges and small craft 12 may not be engaged prior to reaching critical asset 10.

Figure 2B:
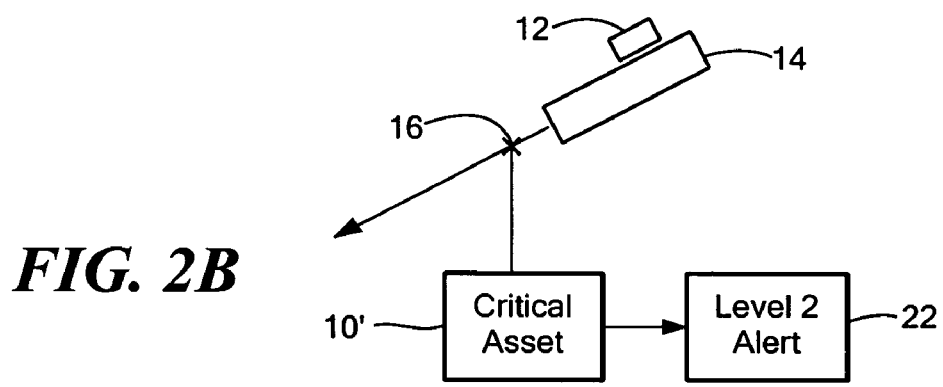
FIG. 2B is a schematic depiction now showing the smaller craft hiding in the radar shadow of a larger vessel and the Level 2 alert generated by the subject invention.
Figure 2C:
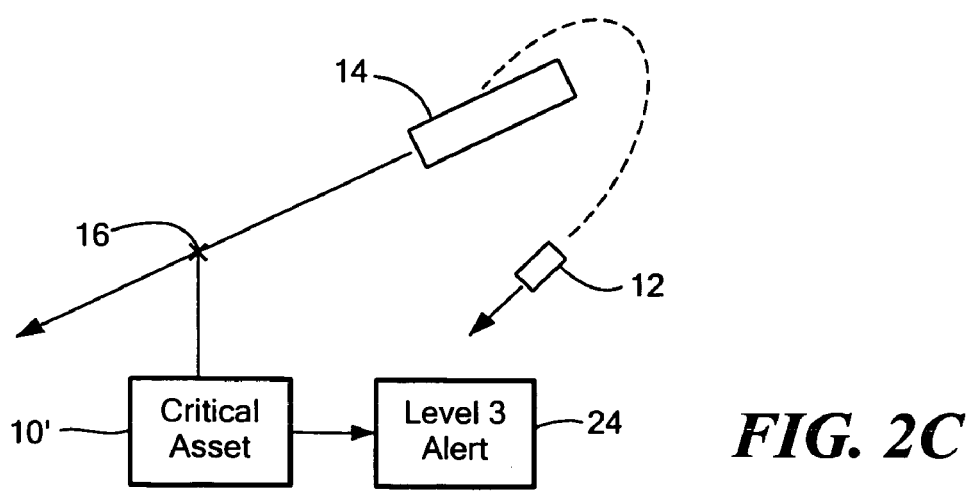
FIG. 2C is a schematic depiction showing the smaller craft emerging from the radar shadow of the larger vessel and the generation of a Level 3 alert in accordance with the subject invention.

In contrast, when critical asset 10', FIGS. 2A-2C, is equipped with or monitored by the hostile intention assessment system of the subject invention, the processing subsystem thereof is programmed a) to determine if a first target (e.g., craft 12, FIG. 2A) is approaching a second target (e.g., vessel 14); b) to determine if craft 12 is small relative to vessel 14; and c) determine if vessel 14 is approaching critical asset 10'. If these conditions are met, a first alert (e.g., a Level 1 alert as shown at 20) is generated by the system of the subject invention. Preferably, the CPA and TCPA of small craft 12 relative to large vessel 14 is computed in order to determine if small craft 12 is on an intercept course with large vessel 14. Also, the CPA and TCPA of large vessel 14 relative to critical asset 10' is computed and the Level 1 alert is generated only if the CPA is below certain configurable predetermined threshold to prevent false alarms. The minimum CPA/TCPA thresholds must also last for a certain duration before the Level 1 alert is generated to prevent false alarms. The large ship's TCPA should be positive to indicate it is closing on the critical asset. A low CPA with TCPA<0 means the ship is going away. But, the large ship may be quite slow, so a small TCPA may not be a required condition.

When small craft 12 is now in the radar shadow of larger vessel 14, FIG. 2B, it cannot now be tracked by the radar subsystem. When the track quality indicator for small craft 12 degrades below a predetermined configurable amount, a second alert (e.g., a level 2 alert 22) may be generated and, in addition, the track of craft 12 is associated with the track of vessel 14 so the track of craft 12 is not lost. When the track of craft 12 is reacquired by the radar subsystem, a third alert (e.g., a Level 3 alert) may be generated as shown at 24 in FIG. 2C. Now, since the hostile behavior of small craft 12 has been noted and its track was not lost, the appropriate engagement actions can be taken in order to prevent small draft 12 from coming too close to critical asset 10'.

Figure 3A:
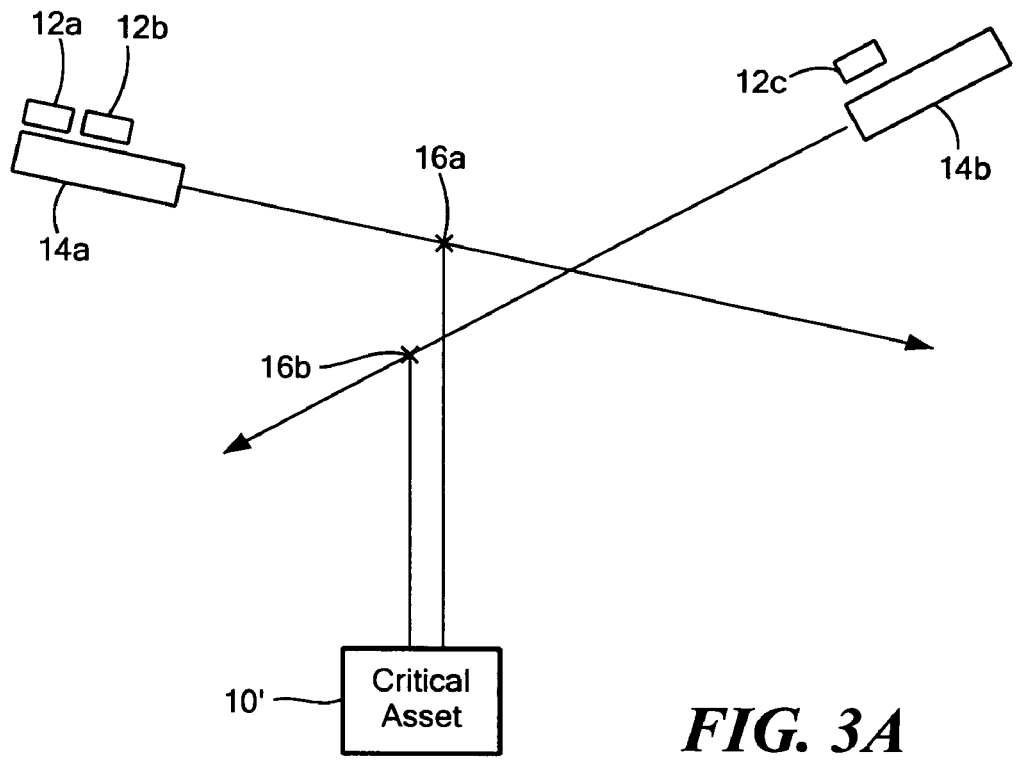
FIGS. 3A-3B are schematic depictions showing how the subject invention is also useful in connection with scenarios where multiple small craft are hiding within the radar shadow of multiple larger vessels.
Figure 3B:
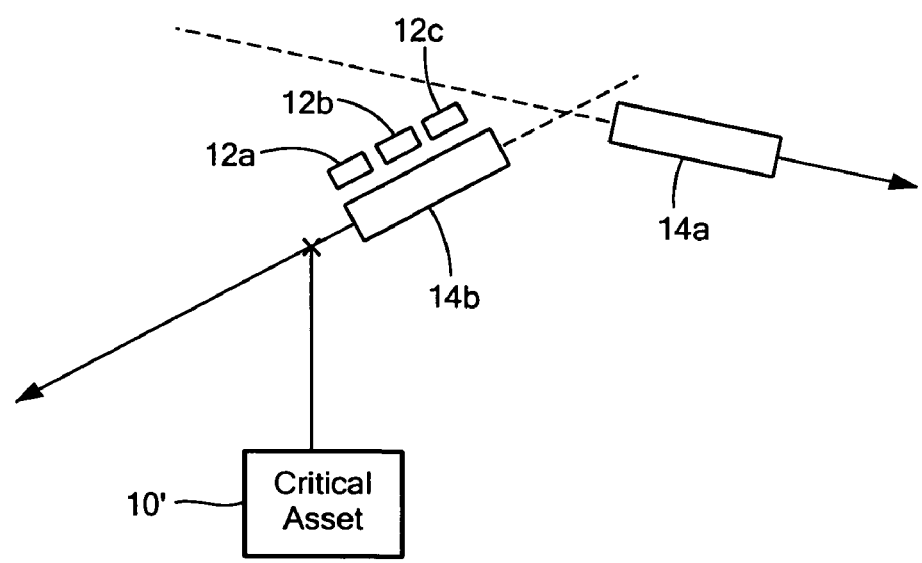

The system and method of this invention, by tracking the CPA and TCPA of all pairs of vessels 12a-c and 14a-b, FIG. 3A, relative to each other and relative to critical asset 10', can provide an assessment of even busy sea ports and waterways when, for example, small boat 12c is hiding within the radar shadow of larger vessel 14b in order to position small boat 12c at or near CPA 16b. Note also small craft vessels 12a and 12b hiding in the radar shadow of larger vessel 14a and then, in FIG. 3B joining small craft 12c to hide in the radar shadow of larger vessel 14b. Even in such complex situations, a level 1 alert has been generated for all of small craft 12a, 12b, and 12c prior to the situation shown in FIG. 3A, a Level 2 alert is generated once each of the smaller craft is hiding within the radar shadow of a larger craft, and a radar tracks of all the vessels are maintained.

Figure 4:
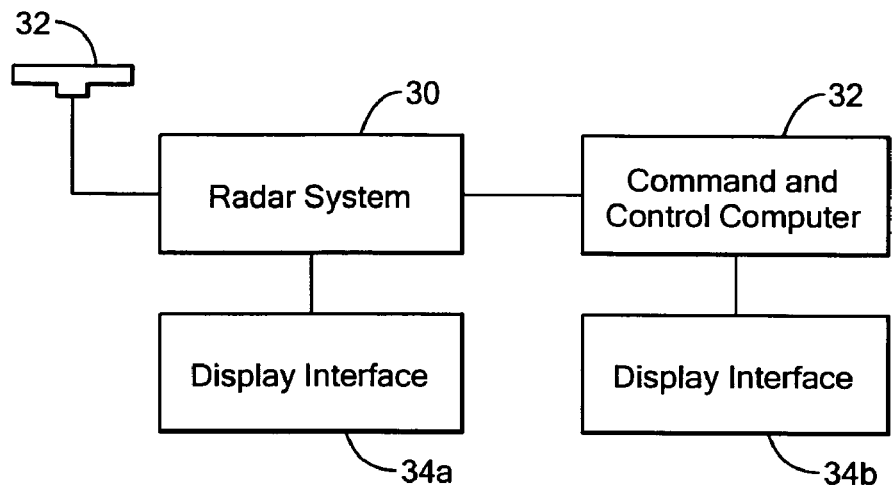
FIG. 4 is a block diagram showing the primary components associating with one preferred embodiment of the hostile invention assessment system of the subject invention.

FIG. 4 depicts one example of a hostile intention assessment system in accordance with the subject invention. Although any tracking sensor subsystem such as a radar system, a combined electro-optical/infrared (EOIR) sensor equipped with a laser range finder, or an infrared surveillance and tracking system may be used to supply the system with tracking data, a Raytheon Mariner 2200 radar system 30, with antenna 32 was used in the prototype system because it met the International Maritime Organization specifications for Automatic Radar Plotting Aids.

The processing subsystem for the hostile intention detection system using radar ("HIDRA") was implemented on a personal computer in the prototype but would be incorporated into radar system 30 and/or command and control computer 32 typically connected to radar system 30 by an ethernet connection. The critical asset to be protected (e.g., a ship) is equipped with radar system 30 or, alternatively, the critical asset to be protected is monitored by an installation (e.g., a ground based installation) equipped with radar system 30.

The processor subsystem depends on track information from a two-dimensional surface target tracking device. The implementation is enhanced by the capabilities of the Mariner 2200 radar subsystem including the capabilities for providing size estimates of targets under track, providing a track quality indicator, providing for manual repositioning of tracks (POSCOR), providing for Tug-and-Tow association of tracks, and providing for automatic and priority track types. Fundamentally, the processor subsystem uses position and velocity data or surface tracks. The system alerts a human operator to take action, especially to identify the potential for a small craft to present a threat. Situation awareness displays 34a and/or 34b allows operator interaction with the system. It is assumed that a small craft is in radar coverage prior to a large ship coming into position. At this initial time, the radar subsystem will have both the small craft and the large ship in track. The tracking capabilities of commercial navigation radars are described in the specification for Automatic Radar Plotting Aids (ARPA) by the International Electrotechnical Commission (EEC).

At some point, the small craft will maneuver into a position to get into the radar shadow of the large ship. The preferred method used to detect this (potentially hostile) action is based on the Closest Point of Approach (CPA). In analysis of CPA, the tracks of both the small craft and the large ship are treated as though they will have constant velocities so their paths will be straight lines on a flat Earth. These lines can be lifted into a three-dimensional representation using "time" as the vertical axis. In this three-dimensional view, the straight line paths of the tracks may not intersect, but there will be a point in time at which the lines are as close as they will ever be. This point in time is the Time to Closest Point of Approach (TCPA). An alarm generated whenever both CPA and TCPA were below certain bounds would lead to many alarms when the situation is not of concern (false alarms). The technique for alerting by assuming constant velocities based on CPA and TCPA is used for ARPA systems in preventing collisions between the vessel carrying the radar and other ships. But, extending CPA/TCPA analysis to all pairs of tracks, and not just individual tracks with own ship, is one primary idea behind the subject invention.

In order to reduce the potential for false alarms, an alarm is typically not generated under the following conditions: a) the closer target in the track pair is headed away from the radar, b) the closer target is smaller (by a configurable amount) than the other target, c) the CPA/TCPA limits are violated for only a (configurably) short amount of time, and/or d) the farther (typically smaller) target has been classified as "Friendly".

In fact, it is determined that the closer target is approaching the radar by demanding that it has a (configurably) small CPA with the radar. ARPA radars automatically provide the CPA of any track with the radar. The ability to estimate target size is part of the Mariner 2200 radar system, but is not part of all comparable radars. It is not essential whether the target size concept is based on spacial extent or based on Radar Cross Section (RCS) or any other appropriate metric. The goal is to detect situations in which the farther target can hide using the closer target's shadow and for that it is assumed the closer target has to be considerably larger.

In a busy harbor scene, many sailboats can be tacking in the wind and generate small CPA/TCPA situations for brief periods. In these situations, it is worthwhile to have a minimum time requirements to be in the low CPA/TCPA condition prior to sounding the alarm.

Figure 5:
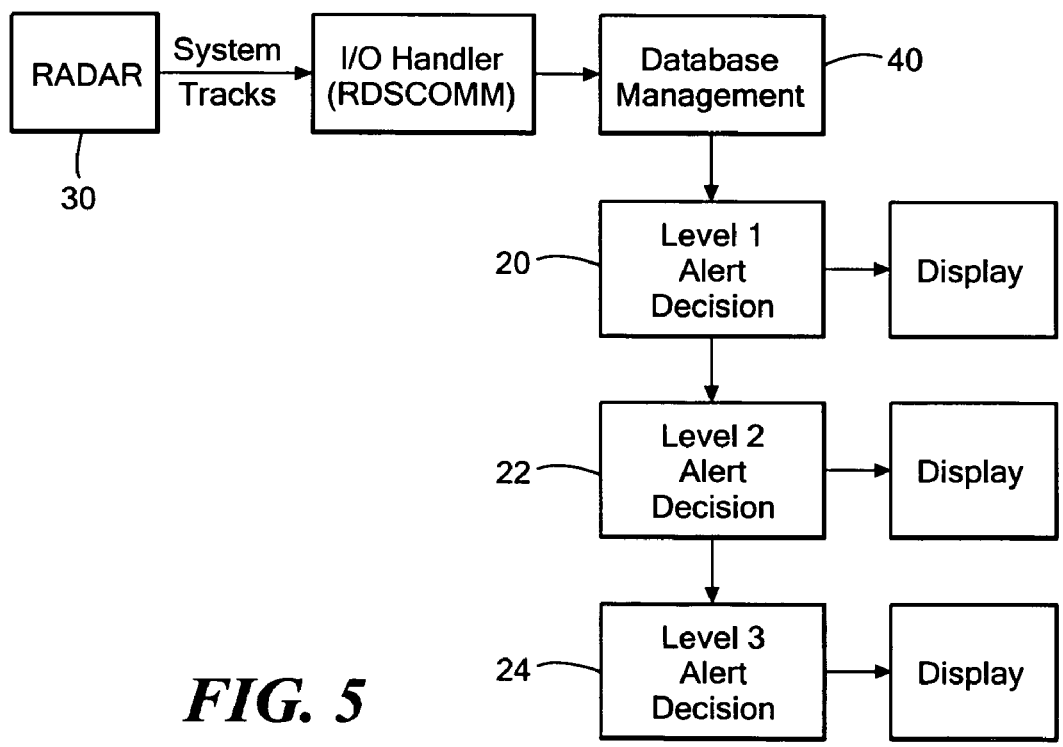
FIG. 5 is a block diagram showing, in more detail, the logic flow of the system of the subject invention.

When a pair of radar tracks output from radar subsystem 30, FIG. 5 produces a sufficiently low CPA and TCPA, the nearer of the pair is approaching the radar, the nearer of the pair is much larger than the farther, the farther is not classified "Friendly", and the "hostile maneuver" condition persists for a reasonable period of time, a Level 1 Alert is issued, and the pair of offending tracks is highlighted either by graphic display, by text message, and/or by database 40 logic. The track pair are promoted (if necessary) to priority tracks that cannot be automatically dropped from the system.

The purpose of the Level 1 Alert is to allow operators to use whatever means (e.g., Electro-Optical/Infrared (EOIR) sensors, or binoculars) may be available to identify the small craft as being of further interest before it reaches the radar shadow of the larger vessel and is no longer observable. Standard track classifications of Friendly, Hostile, Unknown, etc. can be used. No further alerts are generated if the farther target was known to be "Friendly".

The Mariner 2200 radar system has two kinds of tracks. One kind is automatically acquired and can be automatically dropped if the operator shows no particular interest in the track by appropriate management. The other kind of track is a priority track that has been manually acquired or updated by appropriate management. This second kind of track will not automatically be dropped when it can no longer be updated. This second sort of track, when not updated for many radar revisit intervals, is "parked" in its last position and an alert is sounded.

When a Level 1 Alert is issued for a pair of tracks, both tracks are "promoted" to this second class of priority tracks so the potentially hostile target will not be dropped from the system.

The Mariner 2200 radar system keeps a track quality indicator by counting the number of antenna scans of the track that update the track or fail to update the track due to a lack of detection. When the track quality on the farther track descends below a (configurable) certain level, the Level 2 Alert 22 is issued and indicated graphically, by textural message, and/or by database logic to indicate the tracks causing the alert.

The purpose of the Level 2 alert is to let an operator know that the radar can no longer detect the potentially hostile target. That target may follow in the larger ship's shadow for along way before it re-appears. It will be up to an alert operator to pick it up when it finally does re-appear.

After the Level 2 Alert, the offending pair is formed into a Tug-and-Tow relationship. The Mariner 2200 radar system has a facility for de-cluttering the display and indicating graphically that a pair of tracks are linked as a tug and tow by a single symbol. A similar symbol is used on the large ship (presumably still in track and being updated) to indicate that small target has been lost behind it. This special Tug-And-Tow feature will allow the information on the lost track to be kept in the track database 40 for later use.

When an alerted operator sees a new video return on the radar PPI close to the Tug-And-Tow pair, a HIDRA POSCOR operation restores to that video location the track information of the potentially hostile track. The Mariner 2200 system accomplished this function by the operator selecting (hooking) the Tug-And-Tow symbol and then selecting the POSCOR option and then pointing (clicking the track ball or mouse) on the video of the new target location.

The purpose of the POSCOR is many-sided. First of all, typical ARPA radars take up to 30 seconds to acquire a mature track. If this is a fast boat in protected waters, it could be capable of speeds in excess of 40 kts and may close a considerable distance in that time. In the worst case, a truly hostile threat could get inside the engagement range of all weapon systems. Secondly, many situational awareness systems are track based. This means that without a track, the system is unaware of the threat. Thirdly, the track information, the identification and classification of this target has been kept with the tug-and-tow and will save typing or time entering the data into the system.

Repeated POSCORs from the same Tug-And-Tow are allowed since the large ship may hide more than one attacker (See FIG. 3).

The POSCOR issues the Level 3 alarm 34. The operator(s) will want to know that the potentially hostile maneuver has been accomplished and the target is once again in view. This new POSCORed track is now a candidate for further HIDRA processing. It could now form a new HIDRA pair with another approaching ship.

As in all tracking systems, there must be a facility for manual intervention with the automation. The Mariner 2200 radar system has the capacity for hundreds of tracks. Operators will want to acquire new ones, drop old ones, and fuse or separate tracks from separate radars. The processor logic must be manageable within this database. Manual creation of links (Level 1 alerts) and prevention of certain tracks from participating in the assessment system should be provided for.

The many configurable parameters provided are adjustable by authorized operators to tailor the sensitivity of the system to the traffic patterns of the particular installation.

Typical of the behaviors that led to the subject system is when a small craft uses the radar shadow cast by a much larger vessel to get close to the radar position (own ship). In fact, it has been noted that small craft in the Gibraltar Straits cross illegally from North Africa to Europe by using the radar shadows of commercial ships to stay out of track by the surveillance radars.

One of the key architectural features of radar surveillance systems is automatic radar plotting aids (ARPA) that provide for the automatic detection and tracking of vessels sailing into an auto-acquisition zone (circle, polygon, annulus fixed to the Earth or moving with own ship). The rules for commercial ARPA radars allow for antenna rotation rates as low as 3 seconds and as many as 20 rotations (scans) prior to reporting a mature track on a target. If a situation awareness display receives only track information from the radar like this, a target could spend nearly a minute in the open without presenting a track to an operator. In low sea states, a high speed RHIB or jet ski could move a half mile in that kind of time.

Imagine a small craft in track at 5 miles in an area often visited by small craft and presenting no threat to own ship. Imagine a commercial container ship at 4 miles whose Closest Point of Approach (CPA) to own ship is 1000 meters and whose Time to CPA (TCPA) is 20 minutes. At 4 miles away, the container ship has not yet set off a proximity alert. The CPA is small, but the TCPA is to large to yet cause an alert. Now imagine the small craft turning onto a collision (rendezvous) course with the container ship. In just a few minutes, the small craft is in the radar shadow of the container. If the small craft track was automatically acquired, then once it goes several minutes without radar update, the system will automatically drop the track without alert to the operator. (Automatically acquired tracks are automatically dropped unless promoted by an operator action). Now, when the container is at its CPA, the small craft emerges and starts racing toward own ship at 30 kts or better. In 64 seconds the small craft will be beside own ship. At best, the system will have seen the target track for 4 seconds when it is at a range of 60 meters or less.

There are several problems with this scenario. First, 4 seconds may not be enough time to react to the hostile target now next to own ship. Second, acquisition of a track at very short range is not as simple as at longer ranges because of receiver blanking after transmitter trigger, antenna elevation pattern losses, and steep angles into sea clutter. Third, and most importantly, certain engagement systems are not designed to operate at these short ranges.

By measuring relative sizes of tracks, the radar system can determine if a pair of tracks involves a scenario in which a small target could be occluded by a much larger one. By computing CPA/TCPA for every pair of tracks in the system, the radar can determine if a small target track is maneuvering itself on a collision course with a larger vessel.

When the system determines that a smaller track at longer range has a sufficiently small CPA and TCPA with a larger track, and it has maintained that collision course for a sufficient long period of time, it will issue a Level 1 alert and highlight the offending tracks. The operator is then cued to classify the track. If the operator wants to err on the side of caution, the track should be classified as a threat track. That classification automatically promotes the track so that it cannot be automatically dropped by the system.

When the small track fails to be updated by the radar for a sufficiently long period of time, the system presumes that the small craft has entered the radar shadow of the larger track. A Level 2 alert is issued and the track symbol for the small craft is now associated with the track of the larger vessel and propagated with the course and speed of the larger vessel.

To help alert the operator when the small craft re-emerges from behind the larger track, the radar video on the PPI in a window surrounding the larger track will use highlighting colors to distinguish significant returns on the latest scan that were not present in the earlier scans.

When the operator perceives the small target's video on the PPI, a special track symbol is moved (position correction=POSCOR) by operator action from the large track to the new video. That POSCOR operation on a track cues the operator (and automatically other EO/IR sensors) to re-identify the track. By virtue of this POSCOR, the situation awareness display has a track on the small vessel while it is still 1000 meters and 64 seconds away. Note that each Mariner 2200 radar system is capable of 200 Sensor Tracks and a system of multiple radars is capable of 300 System Tracks.

With a potential for 300 System Tracks, the number of possible pairs of tracks can be B(300,2)=Binomial(300, 2)= (300×299)/2=44,850 pairs of System Tracks. One preferred architecture that has the CPA/TCPA computation for pairs of tracks done by an external processor, say a situational awareness display in a combat system, Integrated Bridge System, or Ship Protection System. Given sufficient processor power, it may be simpler to compute CPA/TCPA for all pairs and then eliminate those whose CPA/TCPA are large from further computations.

Fundamental to low false alarms in the detection of hostile maneuvers is the estimation of relative sizes of the targets under track. Many methods have been proposed and the Mariner 2200 radar system software architecture includes target size estimation. The Mariner 2200 radar system has a gross spacial extent and width estimate of size in the system track messages that HIDRA can exploit. There are issues at very long ranges and various pulsewidth modes that have to do with matching resolution with target size estimation. System implementation should consider a maximum range for use of target size considerations.

The form of the tracking system's estimate of target size is not essential to the inventive system and whenever one of the tracks is many (configurable) multiples larger than the other is typically key regardless of the metric supplied.

Let V(r, α) be the Radar Data Extractor Board (RDE) 8-bit voltage reading of the radar video at range bin r and azimuth α. The Mariner 2200 radar system's RDE supplies this value to the Central Processing Unit (CPU) for every threshold crossing. The preferred target size estimate is $$\text{size} = k \iint_{\substack{\text{Target} \\ \text{Blob}}} V(r, \alpha) r^2 dr d\alpha \tag{1}$$

where k is a convenient scaling constant. This computation for "size" maybe inconvenient (and not just because it is an integral instead of a sum). The "Target Blob" of threshold crossings can be a very oddly shaped arrangement of contiguous range bins and azimuth cells. It may be much more convenient to use the computations already part of a "gross box" centroiding algorithm:

$$\text{size} = k \left( \sum_{\text{Target Blob}} \sum V(r, \alpha) \right) \times \tag{2}$$
$$(\text{Range of Centroid})^2 \times (\text{Gross Box } \Delta r) \times (\text{Gross Box } \Delta \alpha)$$

and $$\text{size} = \tag{3}$$
$$k \left( \sum_{\text{Target Blob}} \sum V(r, \alpha) \right) \times R \text{ Centroid} \times (GB \Delta r \times (GB \Delta \alpha \times R \text{Centroid}))$$

so $$\text{size} = k \left( \sum_{\text{Target Blob}} \sum V(r, \alpha) \right) \times R \text{ Centroid} \times (GB \text{ Area}) \tag{4}$$

In this arrangement, all of the video levels in the contiguous range/azimuth bins are added during the centroiding process and multiplied by the centroid's range, multiplied by the Gross Box's area, and then the result is scaled in a convenient way. Note that V(r, α)>0, and size should always be non-negative. If the value of "size" is too large to fit into a convenient storage location, size should be truncated (limited or clipped) to the largest allowed value. Hopefully, a convenient value of k can be chosen to avoid frequent truncations.

Note that if the target echo passed a threshold in a single range/azimuth cell, then size=c V $R^2$, where c is the constant k times the range bin's area.

Standard references on radar provide a radar performance prediction in the form of the "R to the fourth" or radar range equation:

$$S = \frac{a\sigma}{R^4} \qquad (5)$$

where S is the signal power, "a" is a scaling factor that depends on many parameters, and σ is the target RCS measured in square meters. Significantly, S is in units of power in Watts. Now, V=V(r, α) is a voltage measured by the radar from the echo by a target of RCS=σ. By standard electrical conversions, S=IV=$V^2$/Ω, where I is the current and Ω is the impedance in the electric circuit, nominally around 75 Ohms. Therefore, the target RCS is proportional to the square of the voltage times $R^4$: σ ∝ $V^2 R^4$.

Now consider two targets and label their corresponding measurements with subscripts. The with a little algebra:

$$\frac{\sigma_2}{\sigma_1} = \frac{S_2 R_2^4}{S_1 R_1^4} = \frac{V_2^2 R_2^4}{V_1^2 R_1^4} \qquad (6)$$

On the other hand, $$\frac{size_2}{size_1} = \frac{k\sum V_2 \times R_2^2 \times \Delta r_2 \times \Delta \alpha_2}{k\sum V_1 \times R_1^2 \times \Delta r_1 \times \Delta \alpha_1} \qquad (7)$$

Assuming that the targets reside in a single range/azimuth cell, we can simplify to $$\frac{size_2}{size_1} = \frac{V_2 \times R_2^2}{V_1 \times R_1^2} = \sqrt{\frac{\sigma_2}{\sigma_1}}. \qquad (8)$$

This simple formulation would influence a design for radar target size that first calibrated the constant of proportionality and used $V^2$ and $R^4$ rather than V to the first power as we've required in section 2.1.1. Many factors contribute to the decision that simplifies the size estimate. One is that the radar receiver is not linear. It includes a log-amp detector, so at the very least, the equation for RCS has to be complicated by the inverse of the log-amp's transfer function. Secondly, the RCS estimation works well when the target is well matched to the pulsewidth in use and the range/azimuth sample size. Since our targets (large ships) will often be many times the range/azimuth cell's area, the formulation above needs further complications.

Most importantly, the voltages measured by the radar include clutter, and the clutter can differ significantly with aspect angle. So while we have a formula that has a conceptual tie to RCS, the value is not directly related to RCS. It may be worthwhile to re-visit in the future the decision to base target size on something not directly related to RCS.

As a final note about RCS, consider that large ships have RCS in excess of 10,000 square meters and RHIBs are typically less than 5 square meters. Their ratio is 2,000 or 33 dB. Their "size" ratio will be about 44 that is easy to detect. If a RHIB hides behind a 100 square meter fishing boat, the RCS ratio is 20 and the size ratio is about 4. Making a HIDRA alert off of such a small ratio would cause lots of "false alarms". Generally speaking, we are not as concerned about that scenario for several reasons including the height advantage the radar likely has over fishing boats and the difficulty of staying in the shadow.

Closest Point of Approach and Time to Closest Point of Approach (CPA/TCPA) are defined in ARPA requirements from the IEC. The target model is in a plane (tangent to the Earth at the location of the radar), and both tracks are presumed to have velocities that are very nearly constant over the scan period of the radar. This assumption often fails and extensions to HIDRA that incorporate acceleration detection is warranted.

We only consider pairs of tracks for which the closer is significantly larger than the farther and if the larger track is approaching own ship (or some other point of interest). To check if the larger track is approaching own ship, it is only necessary to check that its TCPA>0. (NOTE: this is the usual collision avoidance TCPA with ownship, not the HIDRA TCPA for the pair of tracks defined below). If TCPA>0 but CPA>L, the track pair is not a candidate for HIDRA—the big ship is not coming close enough to be a threat. Initially, we let L be huge since the large ship may turn and reduce its CPA after a small craft gets into the shadow. Shipping lane boundaries may influence the setting of L operationally.

Under these assumptions, a pair of tracks can be modeled by $$x_1(t) = a + v_1 \sin(\theta_1) t \qquad (9)$$

$$y_1(t) = b + v_1 \cos(\theta_1) t \qquad (10)$$

$$x_2(t) = c + v_2 \sin(\theta_2) t \qquad (11), \text{ and}$$

$$y_2(t) = d + v_2 \cos(\theta_2) t \qquad (12)$$

where v is the track speed and θ is the track (True) course. The vectors P(t)=(x, y) are line of sight position vectors from the radar. The vector H(t)=$P_2$(t)−$P_1$(t) is the vector from track 1 to track 2. The time t at which the length of H(t) is a minimum is the TCPA. The length of H(TCPA) is the CPA.

$$\text{Length of } H(t)^2 = ((c-a) + t(v_2 \sin(\theta_2) - v_1 \sin(\theta_1)))^2 + \\ ((d-b) + t(v_2 \cos(\theta_2) - v_1 \cos(\theta_1)))^2 \qquad (13)$$

by the Chain Rule of Calculus:

$$2 \times \text{Length of } H(t) \times d \text{ Length of } H(t)/dt = 2(v_2 \sin(\theta_2) - v_1 \sin(\theta_1))((c-a) + t(v_2 \sin(\theta_2) - v_1 \sin(\theta_1))) + 2(v_2 \cos(\theta_2) - v_1 \cos(\theta_1))((d-b) + t(v_2 \cos(\theta_2) - v_1 \cos(\theta_1))) \qquad (14)$$

So, d Length of H(t)/dt=0 if t=TCPA where $$TCPA = \frac{(v_2 \sin(\theta_2) - v_1 \sin(\theta_1))(a-c) + (v_2 \cos(\theta_2) - v_1 \cos(\theta_1))(b-d)}{(v_2 \sin(\theta_2) - v_1 \sin(\theta_1))^2 + (v_2 \cos(\theta_2) - v_1 \cos(\theta_1))^2} \qquad (15)$$

This formula, when one of the tracks is actually ownship, is already part of the radar software for collision avoidance. In this special case, a=b=0. More generally, a =$r_1$ sin($\beta_1$) and b=$r_1$ cos($\beta_1$) where we use r for the range of the track and $\beta$ as its True bearing from the radar. (a, b) is the present position of the first track in the (x, y) plane and (c, d) is the present position of the second track in these (x, y) Cartesian coordinates.

Note that vector notation simplifies the formula and hence provides a double check on errors. We use the standard notation for vector dot products.

$$\|H(t)\|^2 = H(t) \cdot H(t) = (P_2(t) - P_1(t)) \cdot (P_2(t) - P_1(t)) \qquad (16)$$

So, we can take derivatives and set the result to 0 to solve for TCPA:

$$0 = 2H(TCPA) \cdot H'(TCPA) = 2(P_2(TCPA) - P_1(TCPA)) \cdot (V_2 - V_1) \qquad (17)$$

where we use the notation $V_i = P_i'(t) =$ constant vector $v_i(\sin(\theta_i), \cos(\theta_i))$, so $$0 = (P_2(TCPA) - P_1(TCPA)) \cdot (V_2 - V_1) \qquad (18)$$

$$0 = \left( \begin{pmatrix} c - a \\ d - b \end{pmatrix} \cdot (V_2 - V_1) + TCPA \|(V_2 - V_1)\|^2 \right) \qquad (19)$$

So, $$TCPA = \frac{(V_2 - V_1) \begin{pmatrix} a - c \\ b - d \end{pmatrix}}{\|V_2 - V_1\|^2}. \qquad (20)$$

This compact formula makes it easy to see that the System Track data structures have all of the information necessary to compute TCPA since it involves only the position and velocity vectors of both tracks CPA=H(TCPA) for the pair of tracks. It is useful to call this the "HIDRA CPA" to distinguish it from the collision avoidance CPA of a track with own ship.

Only pairs of tracks for which the closer is significantly larger than the farther and if the larger track is approaching own ship (or some other point of interest) are considered. To check if the larger track is approaching own ship, it is only necessary to check that its TCPA>0. (NOTE: this is the usual collision avoidance TCPA with ownship, not the HIDRA TCPA for the pair of tracks). If TCPA>0 but CPA>1, the track pair is not a candidate for HIDRA.

If CPA<$L_r$ and TCPA<$L_t$ and the more distant track (say, track 2) is smaller and not classified as Friendly, size$_1$>K× size$_2$, neither track's velocity is consistent with an airborne target (speed>60 kts), and this condition has persisted for T seconds, then the system will issue a stage 1 alert with a audible signal and by changing the symbology of the offending tracks. The parameters $L_r$, $L_t$, K, and T can be determined based on the intended use of the system and should be implemented as easily re-configurable in software or perhaps even by GUI control. The choice of symbology for stage 1 alerts is not important. It is recommended that each System Track in the offending pair receive a different symbology and perhaps linked by a dashed line. It is anticipated that the small track will soon disappear, so it is the symbology of the large track that will provide situational awareness until the small target re-appears.

Assuming for the moment that a processor external to the radar computes the CPA/TCPA values and issues the Stage 1 alert, it is important for that external processor to notify the radar of the alert and allow the radar system's symbology to also change. It is by operator observation of the re-emergence of the small track on the radar PPI that the small target's track will be re-established.

The stage 1 alert can be acknowledged by the operator in two ways. The first is to classify the small track as Friendly. In this case, the alert is dropped and the small target is excluded from future alerts. The second is to classify the track as potentially hostile. When the operator acknowledges the alert by classifying the track as hostile, the track is promoted and will not be automatically dropped when it fails to get new radar updates.

When the stage 1 alert is issued for a pair of targets, both targets are visible to the radar and being tracked. If the small track fails to be updated for some number of scans of the antenna, a stage 2 alert will be issued.

When the stage 2 alert is issued, the track on the small target will be automatically associated with the larger target's track in a fashion similar to the Mariner 2200 radar system's tug-and-tow track fusion feature. The symbology will change to indicate the fusion with a hostile track. The track labels and classification of the small craft will be kept while its track is coasting with the larger target's track.

When a stage 2 alert has been issued, the video on the PPI will be highlighted in the following manner. A video window surrounding the larger target will be created. Within this small window, video levels (shades of green (SOG)) on the present scan will be compared with previous scans. At each pixel, if the new video SOG is M higher than in the previous scans, that pixel will be given a highlighting color dependent on the color scheme in use.

The ability to store video from previous scans is part of the persistence architecture of the Mariner 2200 radar system. The Mariner 2200 radar system has several PPI color schemes for daytime and nighttime use.

The goal of the highlights is to help the operator quickly see the emergence of the small target from behind the larger one.

When the operator sees the small target re-emerge into radar view, the actions are to "hook" the larger track's track symbol and do a "HIDRA POSCOR". This special POSCOR feature will place a track on the highlighted video with the label and classification information that has been stored with the "tug-and-tow" data structure. NOTE: POSCOR is Mariner 2200 radar system terminology for a manual position correction of a track.

The HIDRA POSCOR can be used to automatically cue EO/IR sensors to the track and confirm the tracks identity. Other engagement actions can now be set into motion automatically or manually such as shining a bright light on the target, announcing an audible warning to the target in various languages, and ultimately firing on it.

The key is that the HIDRA POSCOR has taken place at the moment of the target's re-appearance and an automatic acquisition time period has been saved. The POSCOR track is available to the Situation Awareness system (e.g., Combat System of Ship Protection System) almost immediately, saving up to a minute and 1000 meters of reaction time.

HIDRA track management follows ordinary track management in most respects. An operator can manually delete a HIDRA track before a stage 2 alert. This clears the relationship of the pair, i.e., the small HIDRA track and its large counterpart.

After a stage 2 alert, the operator can disassociate the small target's track from the larger target's track. Then the smaller target's track can be POSCOR'd (ordinary POSCOR). This would be useful after a target enters the radar shadow, but then pulls away from the larger target. This action will clear the HIDRA relationship between the targets, but of course they are once again candidates for a stage 1 HIDRA alert if the small target re-enters a collision course.

After a stage 3 alert, the operator may manually drop the small target's track just like any other. However, the HIDRA classification on the large target's track is maintained. The video window continues to provide video highlights, and if another small target emerges, a HIDRA POSCOR may be repeated. We refer to this feature as the "track dispenser" that HIDRA has configured on to the large vessel's track. The operator can re-classify the track as non-HIDRA.

After a stage 1 alert and prior to a stage 2 alert, a connection is made between the tracks of the pair of targets. If either one of these tracks fails to get radar updates for a significant period of time (presently 120 scans), the usual lost track alert is given. If the operator hooks the symbol for the parked track and drops it, the HIDRA connection with the other track is cleared. The only other reasonable action by the operator is to POSCOR the track that is not updating. This action preserves the HIDRA connection.

If a stage 2 alert has been issued and the large track sails out of radar coverage, the system issues a lost track alert as normal. If the operator chooses to drop the track, both tracks will be cleared. Optionally, the operator can hook the parked track symbol, disassociate the pair, hook one and POSCOR it, then hook the other and either drop or POSCOR it. Also, the operator can hook the associated pair and POSCOR is as a pair. Dropping either or both of the tracks will clear the HIDRA connection. POSCOR of both tracks will preserve the HIDRA connection.

If a large vessel is approaching own ship, it may have small vessel(s) hiding behind it that have never been tracked by the radar. If the operator so chooses, the track can be hooked and manually designated a HIDRA (large) track. This changes its label/symbology. It allows the PPI window highlighting to be enabled and the HIDRA POSCOR is available to trigger a stage 3 HIDRA alert. (We have put a track dispenser on the track.) The difference this time is that there is no small target track structure associated with the larger target's track. A new System Track has to be generated each time the HIDRA POSCOR is activated.

Mariner 2200 radar system uses a proprietary multi-hypothesis tracker that includes a maneuver (or acceleration) detection capability. A large acceleration at short range is clearly a potentially hostile maneuver aimed at breaking radar track. Improvements to the radar system to maintain track in high accelerations are possible. Furthermore, the detection of the maneuvers could be tied to HIDRA alerts. POSCOR of the offending tracks would then trigger the engagement process. Note that CPA/TCPA become very erratic when tracks undergo strong maneuvers. Alerts based on these computations should be suppressed during those times.

When many tracks are interweaving, there is a tendency for track symbol swap and lost tracks. To keep the tracks going right, the operator can be kept quite busy with POSCORs. A better approach is to group the swarm and track a polygonal zone called a Raid. This zone has to be able to split and spawn addition Raids as well as merge multiple Raids. HEDRA then acts on the Raid. The size of the Raid's zone should be scaled appropriately with the engagement assets configured.

The Mariner 2200 radar system is already built to support the fusion of multiple radars of a similar type. The HIDRA sensor fusion concept is to use disparate sensors to augment the management of hostile tracks. For example, when the radar is shadowed, perhaps a sonar or ESM system still has a bearing. At the very least, the additional sensor can confirm the continuing presence of the small craft. It can also trigger the manual HIDRA designation on a large target when the radar has no reason to suspect a hostile situation.

Figure 6:
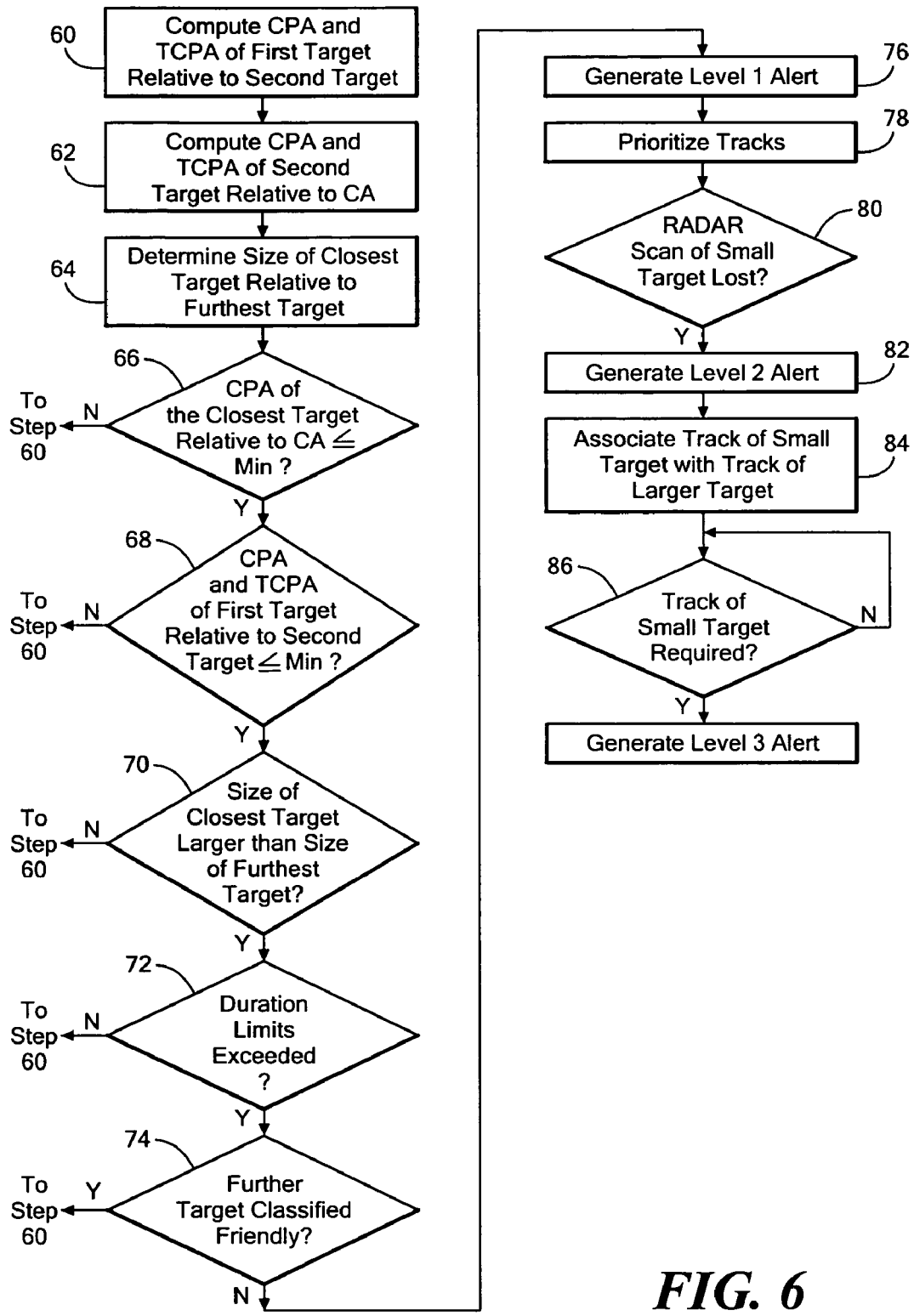
FIG. 6 is a flow chart depicting the primary steps associated with the programming of a hostile intention assessment system in accordance with the subject invention.

In general then, the processing subsystem of radar system 30 and/or command and control computer 32 functions as described with respect to FIG. 6. For all targets, tracked, the CPA and TCPA of the first target relative to the second target is computed, step 60. Next, the CPA and TCPA of the second target relative to the critical asset is computed, step 62. The size of the closest target relative to the furthest target is determined as described above, step 64. If the CPA of the second target relative to the critical asset is less than or equal to some configurable minimum threshold, step 66; if the CPA and TCPA of the first target relative the second target are less than some predetermined minimum, step 68; if the size of the closest target is larger than the size of the further target by some configurable threshold, step 70; if the duration limits discussed above are exceeded, step 72; and if the further target has not already been classified as friendly, step 74, a level 1 alert is generated, step 76. The track of the further smaller target and the track of the larger closer target are then prioritized, step 78. When the radar scan of the small target is lost (see FIG. 2B), step 80, a level 2 alert is generated, step 82. Also, the track of the smaller target is associated with the tract of the larger target using the Tug-and-Tow functionality described above, step 84. Once the track of the smaller target is reacquired as shown in FIG. 2C, step 86, a level 3 alert is generated.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A hostile intention assessment system comprising:
   a tracking sensor subsystem for tracking targets relative to a critical asset;
   a processing subsystem responsive to the tracking sensor subsystem, programmed to:
   determine if a first target is approaching a second target,
   determine if the second target is approaching the critical asset, and
   if the first target is approaching the second target and the second target is approaching the critical asset, generating a first alert.

2. The system of claim 1 in which determining if the first target is approaching the second target includes computing the closest point of approach and the time to the closest point of approach of the first target relative to the second target.

3. The system of claim 2 in which the processing subsystem is further programmed to generate said first alert when the closest point of approach and the time to the closest point of approach of the first target relative to the second target are below predetermined thresholds.

4. The system of claim 3 in which the processing subsystem is further programmed to time the occurrence of the closest point of approach and the time to the closest point of approach of the first target relative to the second target being below said predetermined thresholds and generating said first alert only if the time duration is greater than a predetermined time duration.

5. The system of claim 1 in which determining if the second target is approaching the critical asset includes computing the closest point of approach and the first alert is only generated if said closest point of approach is below a predetermined threshold.

6. The system of claim 1 in which the processing subsystem is further programmed to determine the size of the first and second targets and the first alert is only generated if the first target is smaller than the second target by a predetermined amount.

7. The system of claim 6 in which the size of the first and second targets is determined by the spatial extent of the targets or the radar cross section of the targets.

8. The system of claim 1 in which the processing subsystem is further programmed to prioritize the tracks of the first and second targets after generating the first alert.

9. The system of claim 1 in which the processing subsystem is further programmed to generate a second alert if the first target becomes untrackable by the sensor subsystem.

10. The system of claim 9 in which the tracking sensor subsystem is configured to provide a track quality indicator for targets.

11. The system of claim 10 in which the processing subsystem generates the second alert if the track quality indicator of the first target is below a predetermined threshold.

12. The system of claim 9 in which the processing subsystem is further programmed to associate the track of the first target with the track of the second target if the first target becomes untrackable by the sensor subsystem.

13. The system of claim 12 in which the processing subsystem is further programmed to generate a third alert if the first target is reacquired by the sensor subsystem.

14. The system of claim 1 in which the tracking sensor subsystem includes a radar subsystem.

15. The system of claim 1 in which the tracking subsystem includes an infrared surveillance and tracking subsystem.

16. The system of claim 1 in which the critical asset is equipped with the tracking sensor subsystem and the processing subsystem.

17. The system of claim 1 in which the critical asset is monitored by an installation equipped with the tracking sensor subsystem and the processing subsystem.

18. A hostile intention assessment system comprising:
a processing subsystem configured to:
compute the closest point of approach and the time to the closest point of approach of a first target relative to a second target,
compute the closest point of approach and the time to the closest point of approach of the second target relative to a critical asset,
determine the size of the first target relative to the second target, and
generate a first alert when the computed closest point of approach of the second target relative to the critical asset is below a predetermined threshold, the size of the first target is small relative to the size of the second target, and the computed closest point of approach and time to the closest point of approach of the first target relative to the second target are below predetermined thresholds for a predetermined duration.

19. The system of claim 18 in which the size of the first and second targets is determined by the spatial extent of the targets or the radar cross section of the targets.

20. The system of claim 18 in which the processing subsystem is further programmed to prioritize the tracks of the first and second targets after generating the first alarm.

21. The system of claim 18 in which the processing subsystem is further programmed to generate a second alert if the first target becomes untrackable by a sensor subsystem.

22. The system of claim 21 in which the processing subsystem is configured to respond to a track quality indicator for all targets.

23. The system of claim 21 in which the processing subsystem generates the second alert if the track quality indicator of the first target is below a predetermined threshold.

24. The system of claim 21 in which the processing subsystem is further programmed to associate the track of the first target with the track of the second target if the first target becomes untrackable by the sensor subsystem.

25. The system of claim 24 in which the processing subsystem is further programmed to generate a third alert if the first target is reacquired by a sensor subsystem.

26. A hostile intention assessment system comprising:
a radar subsystem for tracking targets relative to a critical asset; and
a processing subsystem responsive to the radar subsystem and programmed to:
determine if a smaller craft is approaching a larger vessel,
determine if the larger vessel is approaching the critical asset, and
generate a first alert in response.

27. The system of claim 26 in which the processing subsystem is further programmed to prioritize the tracks of the first and second targets after generating the first alarm.

28. The system of claim 26 in which the processing subsystem is further programmed to generate a second alert if the first target becomes untrackable by the radar subsystem.

29. The system of claim 28 in which the radar subsystem is configured to provide a track quality indicator for all targets.

30. The system of claim 29 in which the processing subsystem generates the second alert if the track quality indicator of the first target is below a predetermined threshold.

31. The system of claim 28 in which the processing subsystem is further programmed to associate the track of the first target with the track of the second target if the first target becomes untrackable by the radar subsystem.

32. The system of claim 31 in which the processing subsystem is further programmed to generate a third alert if the first target is reacquired by the radar subsystem.

33. A hostile intention assessment method comprising:
tracking targets relative to a critical asset;
determining if a first target is approaching a second target;
determining if a second target is approaching the critical asset; and
generating a first alert when the first target is approaching the second target and the second target is approaching the critical asset.

34. The method of claim 33 in which determining if the first target is approaching the second target includes computing the closest point of approach and the time to the closest point of approach of the first target relative to the second target.

35. The method of claim 33 in which determining if the second target is approaching the critical asset includes computing the closest point of approach of the second target relative to the critical asset and the first alert is only generated if said closest point of approach is below a predetermined threshold.

36. The method of claim 33 further including the step of determining the size of the first and second targets and generating the first alert only if the first target is smaller than the second target by a predetermined amount.

37. The method of claim 36 in which the size of the first and second targets is determined by the spatial extent of the targets or the radar cross section of the targets.

38. The method of claim 34 in which the first alert is generated when the closest point of approach and the time to the closest point of approach of the first target relative to the second target are below predetermined thresholds.

39. The method of claim 38 further including the step of determining the duration of the occurrence of the closest point of approach and the time to the closest point of approach of the first target relative to the second target being below said predetermined thresholds and generating said alert only if the duration is greater than a predetermined time duration.

40. The method of claim 33 further including the step of prioritizing the tracks of the first and second targets after generating the first alarm.

41. The method of claim 33 further including the step of generating a second alert if the first target becomes untrackable.

42. The method of claim 41 further including the step of providing a track quality indicator for all targets.

43. The method of claim 42 in which the second alert is generated if the track quality indicator of the first target is below a predetermined threshold.

44. The method of claim 41 further including the step of associating the track of the first target with the track of the second target if the first target becomes untrackable.

45. The method of claim 44 further including the step of generating a third alert if the first target track is reacquired.

46. The method of claim 33 in which tracking includes the use of a radar subsystem.

47. The method of claim 33 in which tracking includes the use of an infrared surveillance and tracking subsystem.

48. A hostile intention assessment method comprising:
tracking targets relative to a critical asset;
determining if a smaller craft is approaching a larger vessel;
determining if the larger vessel is approaching the critical asset; and
generating a first alert in response.

49. The method of claim 48 further including the step of prioritizing the tracks of the first and second targets after generating the first alarm.

50. The method of claim 48 further including the step of generating a second alert if the first target becomes untrackable.

51. The method of claim 50 further including the step of generating a third alert if the track of the first target is reacquired.

52. A hostile intention assessment method comprising:
computing the closest point of approach and the time to the closest point of approach of a first target relative to a second target;
computing the closest point of approach and the time to the closest point of approach of the second target relative to a critical asset;
determining the size of the first target relative to the second target; and
generating a first alert when the computed closest point of approach of the second target relative to the critical asset is below a predetermined threshold, the size of the first target is small relative to the size of the second target by a selected amount, and the computed closest point of approach and time to the closest point of approach of the first target relative to the second target are below predetermined thresholds for a predetermined duration.

53. A hostile intention assessment system comprising:
a radar subsystem for tracking targets relative to a critical asset; and
a processing subsystem responsive to the radar subsystem and programmed to:
determine if a smaller craft is approaching a larger vessel,
determine if the larger vessel is approaching the critical asset, and
associate the track of the smaller craft with the track of the larger vessel when the smaller craft is hidden in the radar shadow of the larger vessel.

54. A hostile intention assessment system comprising:
a processing subsystem configured to:
compute the approach a first target relative to a second target,
compute the approach of the second target relative to a critical asset,
determine the size of the first target relative to the second target,
determine relationship of both the first and second targets relative to the critical asset, and
generate an alert when the computed approach of the second target relative to the critical asset meets a predetermined threshold, the size of the first target is small relative to the size of the second target, the computed approach of the first target relative to the second target meets a predetermined threshold for a predetermined duration, and the smaller target is further from the critical asset than the larger target.

* * * * *